2,894,023

SALTS OF THE TRI-ETHYL ESTER OF N-HYDROXYETHYL ETHYLENE DIAMINE TRI-ACETIC ACID

Martin Rubin, Silver Spring, Md.

No Drawing. Application July 12, 1956
Serial No. 597,328

3 Claims. (Cl. 167—58)

This invention relates to the treatment of hemochromatosis and other types of metal poisoning.

Hemochromatosis is a disorder of iron metabolism characterized by abnormal absorption of iron from the small intestine and its deposition in nearly all of the tissues of the body, notably in the liver.

Various chelating agents such as the sodium salts of ethylene-diamine tetraacetic acid and N-hydroxy ethyl ethylene-diamine tri-acetic acid have been suggested for solubilizing deposits of iron and removing the iron from the human system through the urinary tract. However, such agents are somewhat disadvantageous because they should be administered intravenously, and also because they do not specifically provide iron removal from the liver, which is one of the areas where iron concentrates during hemochromatosis.

The prime object of this invention is to provide a composition, capable of intramuscular injection, which can remove iron from the liver of the human body.

Further objects of this invention will be apparent from the description which follows.

The compound which forms the basis of the iron removing composition of this invention is the tri-ethyl esther of N-hydroxyethyl ethylene diamine tri-acetic acid. It can be represented by the general formula:

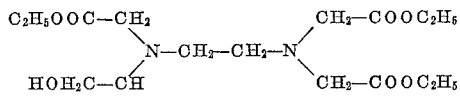

This compound can be prepared according to the procedures outlined in Bersworth Patent 2,428,353 for preparing related esters.

The compound by itself should not be injected because of toxic manifestations at the site of the injection. These toxic manifestations are presumably due to the basic nature of its diamine structure, and/or alternatively to the relative water insolubility of this compound. However, the mono-acid salts of this compound, e.g. the hydrochloride, are water soluble and a neutral solution thereof can be injected into the human system without localized toxic manifestations.

It should be noted that the ester and its acid salts do not have iron chelating properties.

Without being bound thereto, it is believed that the ester is transported through the blood stream to the liver substantially unaltered by reaction with any components of the blood stream. At the liver the ethyl ester protecting groups are removed by liver esterases, unmasking in situ the iron chelating N-hydroxy ethyl ethylene diamine tri-acetic acid. Inasmuch as in hemochromatosis iron deposition in toxic amounts particularly occurs at the liver, the iron chelating acid is unmasked at a point where removal of iron is especially desirable. Further, the N-hydroxy ethyl ethylene diamine tri-acetic acid is not metabolized in the body and as a result passes out of the human system by way of the urinary tract either as a salt (calcium) or as the iron chelate. Experimental studies have demonstrated that the acid salt of the ester, the free acid and the salts (or chelates) of the acid have no untoward effects on the human system.

The medical compositions generally contemplated by this invention comprise water solutions of the tri-ethyl ester of N-hydroxy ethyl ethylene diamine tri-acetic acid having a pH in the range of about 7.0 to about 7.4. Preferably, the ester has been solubilized and the pH attained by addition of an acid selected from the group consisting of: hydrochloric, acetic, sulfuric, and phosphoric acids.

The medically useful concentrations range from 50 to 150 mg. of the tri-ester per cc. of water. The solution may be dehydrated to a water-free composition and distributed as such for later reconstitution as an injectable solution.

An injectable composition may be prepared according to the following example:

0.1 mol (about 26 gm.) of N-hydroxy ethyl ethylene diamine tri-acetic acid is suspended in 500 ml. of anhydrous ethanol. Dry HCl (from a tank) is bubbled through until the acid dissolves in the ethanol. This takes about one-half hour. The ethanol solution is refluxed for two hours and then concentrated by vacuum distillation. The concentrate is dissolved in a minimum of cold water (about 500 ml.) and overlaid with 500 ml. of ethyl ether. Solid potassium carbonate is added until the water solution is basic (which causes the ester to pass from the water into the ether layer. The ether layer is then separated from the water layer, washed twice with cold 10% sodium carbonate solution and thereafter with water. It is dried over magnesium sulphate, filtered and concentrated on a steam pot. The resulting product is a pale yellow oil having an analysis of: C—53.0%; H—8.3%; N—7.8%, which corresponds to the tri-ethyl ester of N-hydroxy ethyl ethylene diamine tri-acetic acid.

To prepare the aqueous solution, one gram of the ester is suspended in 8 ml. of water. Glacial acetic acid is added in small increments until the pH of the aqueous mixture is reduced to the range of 7.0–7.4. At this point the ester has dissolved into the water, yielding a clear solution. This process generally requires about one equivalent of the acid and appears to result in what is essentially the mono-acid salt of the tri-ester.

The resulting solution may be sterilized in the usual way for injection, and administered intramuscularly. A suggested course of treatment is two cc. once a day.

Similarly, solutions of the tri-ester having a pH in the range of 7.0–7.4 are prepared by using one equivalent of concentrated hydrochloric acid, sulfuric acid, and phosphoric acid, respectively, in place of the acetic acid. These solutions are also administerable intramuscularly.

If desired, any of the mono-acid salt solutions may be dehydrated and reconstituted at a later time with 10 cc. of pyrogen-free water for intramuscular administration.

A patient suffering from hemochromatosis received once daily intramuscular injections of two cc. of a 100 mg./cc. solution of the mono-acetic acid salt of the tri-ethyl ester of N-hydroxy ethyl ethylene diamine tri-acetic acid (prepared according to the foregoing example) for a period of three days. Starting less than 24 hours after treatment commenced and continuing for two days after the treatment ended, the urinary excretion from the patient exhibited a marked increase in its iron content compared to its pretreatment and post treatment iron content. Tests showed that the iron content of the body fluids was not altered, indicating that the removed iron had come from non-hemoglobin iron stores in the body, notably from those in the liver.

Whereas the novel compounds and medical preparations of this invention have been primarily disclosed in connection with their iron chelating and removing properties, it is noteworthy that the same preparations can also be used to remove other heavy metals from the human system, notably lead, plutonium, and the fission products of plutonium. In view thereof, all such adaptations of the tri-ethyl ester of N-hydroxy ethyl ethylene diamine tri-acetic acid in this field of utility as may fall within the scope of the following claims are contemplated.

What is claimed is:

1. The water soluble non-toxic mono-acid salts of the tri-ethyl ester of N-hydroxyethyl ethylene diamine tri-acetic acid.

2. A medical preparation consisting essentially of a pyrogen-free aqueous solution of the tri-ethyl ester of N-hydroxyethyl ethylene diamine tri-acetic acid acidified to a pH in the range of 7.0 to 7.4 with a non-toxic acid.

3. A medical preparation consisting of the dehydrated pyrogen-free solution of claim 2.

References Cited in the file of this patent

UNITED STATES PATENTS 2,428,353   Bersworth _____ Oct. 7, 1947

FOREIGN PATENTS 715,976   Great Britain _____ Sept. 22, 1954

OTHER REFERENCES

Science, vol. 118, p. 280 (1953).